United States Patent
Altherr et al.

(10) Patent No.: US 7,613,321 B2
(45) Date of Patent: Nov. 3, 2009

(54) MOVING OBJECT TRACKING METHOD USING OCCLUSION DETECTION OF THE TRACKED OBJECT, AND IMAGE PROCESSING APPARATUS

(75) Inventors: Jean-Aymeric Altherr, Tokyo (JP); Masami Ogata, Kanagawa (JP); Shinichiro Gomi, Chiba (JP)

(73) Assignee: Sony Corporation, Tokyo (JP)

( * ) Notice: Subject to any disclaimer, the term of this patent is extended or adjusted under 35 U.S.C. 154(b) by 475 days.

(21) Appl. No.: 11/055,979

(22) Filed: Feb. 14, 2005

(65) Prior Publication Data
US 2005/0196017 A1 Sep. 8, 2005

(30) Foreign Application Priority Data
Mar. 5, 2004 (JP) .......................... P2004-062578

(51) Int. Cl.
*G06K 9/00* (2006.01)
(52) U.S. Cl. ..................................... 382/103
(58) Field of Classification Search .................. None
See application file for complete search history.

(56) References Cited

U.S. PATENT DOCUMENTS

| 6,252,974 | B1 * | 6/2001 | Martens et al. | 382/107 |
| 6,263,089 | B1 * | 7/2001 | Otsuka et al. | 382/107 |
| 2003/0197779 | A1 * | 10/2003 | Zhang et al. | 348/14.16 |
| 2004/0120548 | A1 * | 6/2004 | Qian | 382/103 |
| 2004/0219980 | A1 * | 11/2004 | Bassett et al. | 463/33 |

* cited by examiner

*Primary Examiner*—Brian P Werner
*Assistant Examiner*—Elisa M Rice
(74) *Attorney, Agent, or Firm*—Oblon, Spivak, McClelland, Maier & Neustadt, L.L.P.

(57) ABSTRACT

An image processing apparatus for performing a tracking of a moving object by setting a tracking area corresponding to a moving object appearing in a video image, by setting a plurality of feature points in the tracking area, and by tracking the plurality of feature points, comprises a tracking processing unit for tracking each of the plurality of feature points from the preceding frame to the present frame, and a motion calculation processing unit for specifying a position of the tracking area in the present frame by estimating the motion of the tracking area based the tracking result of each of the feature points, wherein the tracking processing unit calculates reliability indicating the height of the possibility that a feature point exists in the moving object to each of the feature points, and the motion calculation processing unit calculates the motion of the tracking area by using the reliability.

17 Claims, 11 Drawing Sheets

PROCESS 403

PROCESS 4035

Hist (fp_k)=0,
Still (fp_k)=0,
IsStill (fp_k)=false,
ToBeSel (fp_k)=true.

MOVING OBJECT TRACKING METHOD USING OCCLUSION DETECTION OF THE TRACKED OBJECT, AND IMAGE PROCESSING APPARATUS

CROSS REFERENCE TO RELATED APPLICATION

This application claims priority from Japanese Priority Document No. 2004-062578, filed on Mar. 5, 2004 with the Japanese Patent Office, which document is hereby incorporated by reference.

BACKGROUND OF THE INVENTION

1. Field of the Invention

The present invention relates to a moving object tracking method and an image processing apparatus, and more particularly to a moving object tracking method capable of continuing tracking even if an occlusion (overlapping of objects) on a video image occurs, and an image processing apparatus using the method.

2. Description of Related Art

In the case of tracking a moving object appearing on a video image, a background and a foreground are generally discriminated on the video image, and a tracking area in which the moving object to be a tracking object exists is extracted by utilizing the discrimination result. Moreover, by tracking the motion of the extracted tracking area from one frame to the next frame, the position of the moving object in the next frame is expected.

As a method of tracking a moving object appearing on a video image, for example, a KLT (Kanade-Lucas Tracker) method which tracks a feature point on a video image and is disclosed in a Non-Patent Document 1, is known. In the KLT method, a feature point is selected in the video image, and the selected feature point is tracked from one frame to the next frame by means of a gradient method, or the like.

Moreover, a Patent Document 1 discloses an image object tracking apparatus as one of conventional examples. This conventional image object tracking apparatus judges the occurrence of an occlusion in an image object area set corresponding to a moving object by comparing image object areas at the preceding point of time and at the present point of time, and thereby achieves the improvement of the precision of a tracking process.

Patent Document 1: Japanese Patent Laid-Open Application No. 2003-44860

Non-Patent Document 1: Tomasi, C and T. Kanade, "Detection and Tracking of Point Features", CMU Tech. Rep. CMU-CS-91-132, April 1991.

SUMMARY OF THE INVENTION

However, the tracking process of a feature point by the above-mentioned KLT method is a method devised for tracking a point in principle. Consequently, when the whole of the moving objects to be tracking objects are considered, there is a case where the precision of the tracking process becomes worse. This phenomenon is caused by the following reasons. That is, when feature points to be tracked are selected, a condition is set for the minimum distance of two feature points, but the condition for performing the tracking of the whole of the moving objects efficiently is not considered at all.

Moreover, when an occlusion occurring at the time when a moving object to be a tracking object overlaps with another object occurs, there is a case where the feature point selected in the preceding frame disappears in the next frame. Consequently, there is a case where subsequent tracking cannot be performed.

The present invention was made in view of the above-mentioned respects. That is, it is desired to provide a moving object tracking method or a program by which tracking of a moving object appearing in a video image can be continuously performed at a higher precision, even if an occlusion occurs, or an image processing apparatus or a monitoring system which uses the above-mentioned method.

According to an embodiment of the present invention, an image processing apparatus for setting a tracking area corresponding to a moving object appearing in an image of the image processing apparatus, for setting a plurality of feature points in the tracking area, for tracking the plurality of feature points, and for resultantly performing the tracking of the moving object is proposed. The present image processing apparatus includes a tracking processing unit for tracking each of the plurality of feature points from the preceding frame to the present frame, and a motion calculation processing unit for specifying a position of the tracking area in the present frame by estimating the motion of the tracking area based the tracking result of each of the feature points, wherein the tracking processing unit calculates reliability indicating the height of the possibility that a feature point exists in the moving object to each of the feature points, and wherein the motion calculation processing unit calculates the motion of the tracking area by using the reliability.

As the reliability, for example, the reliability indicating the period during which the feature points exist in the moving object may be used. To put it more specifically, a history indicating the number of frames in which tracking continuously succeeds may be adopted as the reliability.

Moreover, the image processing apparatus may be configured to further include an occlusion detecting unit for detecting the occurrence of an occlusion of the moving object overlapping with the other object, wherein the occlusion detecting unit calculates an occlusion value indicating the possibility of the occurrence of the occlusion by utilizing a change of the number of the feature points. Moreover, the image processing apparatus may be configured in order that the occlusion detecting unit sets a plurality of groups of feature points among the feature points in response to the reliability, and wherein the occlusion detecting unit calculates the occlusion value by means of a change of the number of the feature points in at least one group among the plurality of the groups of the feature points.

Moreover, the image processing apparatus may be configured to further include a selection processing unit for selecting a feature point, wherein the tracking processing unit detects the changes of a position before and after tracking in addition to the tracking process to detect a still point among the feature points the tracking of which succeeds based on a detection result, and wherein the selection processing unit selects a new feature point in place of a part of the feature points among the detected still points.

Moreover, the image processing apparatus may be configured to further include a selection processing unit for selecting a feature point, wherein the tracking processing unit judges whether or not the feature point the tracking of which succeeds is suitable in addition to the tracking process, and wherein the selection processing unit selects a new feature point in place of the feature point which is judged as not suitable.

Moreover, the image processing apparatus may be configured so that the motion calculation processing unit includes a plurality of motion calculating units different from each other for calculating the motion of the tracking area to synthesize the plurality of motion calculating units according to the occlusion value. Alternatively, the image processing apparatus may be configured to perform weighting according to the reliability of each of the feature points at the time of the calculation of the motion by the motion calculation processing unit. Alternatively, the image processing apparatus may be configured to use the occlusion value and the information pertaining to the past motion of the tracking area when the motion calculation processing unit calculates the motion of the tracking area.

According to another embodiment of the present invention, a moving object tracking method and a program for making a computer execute the method are provided. The method sets a tracking area corresponding to a moving object appearing in an image, and sets a plurality of feature points in the tracking area, and further tracks the plurality of feature points. Thereby, the method performs the tracking of the moving object. The present moving object tracking method tracks each of the plurality of feature points from the preceding frame to the present frame, and estimates the motion of the tracking area on the basis of the tracking result of each of the feature points to specify the position of the tracking area in the present frame. Furthermore, the moving object tracking method calculates reliability indicating the height of the possibility that a feature point exists in the moving object to each of the feature points, and calculates the motion of the tracking area by using the reliability.

According to a further embodiment of the present invention, a monitoring apparatus is provided. The monitoring apparatus includes an image processing unit for receiving a picture signal output from imaging means to track a moving object appearing in an image indicated by the picture signal, and a security processing unit for performing monitoring by utilizing a tracking result output by the image processing unit. In the present monitoring apparatus, the image processing unit sets a tracking area in an image corresponding to the moving object, and sets a plurality of feature points in the tracking area, and further tracks the plurality of feature points, and thereby performs the tracking of the moving object. The image processing unit includes a tracking processing unit for tracking each of the plurality of feature points from the preceding frame to the present frame, and a motion calculation processing unit for estimating the motion of the tracking area based on a tracking result of each of the feature points to specify the position of the tracking area in the present frame. Moreover, in the present image processing unit, the tracking processing unit calculates the reliability indicating the height of the possibility that a feature point exists in the moving object to each of the feature points, and the motion calculation processing unit calculates the motion of the tracking area by using the reliability.

According to a further embodiment of the present invention, a game apparatus is provided. The game apparatus includes an image processing unit for tracking an moving object appearing in an image showing by an input picture signal, a user's operation unit for accepting an operation of a user, and a game processing unit for performing a game on the basis of a tracking result output by the image processing unit and an operation signal from the user's operation unit. In the present game apparatus, the image processing unit sets a tracking area in an image corresponding to the moving object, and sets a plurality of feature points in the tracking area to track the plurality of feature points. Thereby, the tracking of the moving object is performed. The image processing unit includes a tracking processing unit for tracking each of the plurality of feature points from the preceding frame to the present frame, and a motion calculation processing unit for estimating the motion of the tracking area on the basis of the tracking result of each of the feature points to specify the position of the tracking area in the present frame. The tracking processing unit calculates reliability indicating the height of the possibility that a feature point exists in the moving object to each of the feature points, and the motion calculation processing unit calculates the motion of the tracking area by the use of the reliability.

DESCRIPTION OF THE PREFERRED EMBODIMENTS

According to the present invention, a moving object tracking method and program which can continuously track a moving object appearing in a video image at a high precision even if an occlusion occurs, an image processing apparatus using the method, and a monitoring system using the apparatus are provided.

An example of an image processing apparatus for implement a moving object tracking method according to an embodiment of the present invention is described with reference to the attached drawings.

In the moving object tracking method implemented by the image processing apparatus of the present embodiment, first, a moving object to be a tracking object is specified, and a plurality of feature points is selected in a tracking area set corresponding to the moving object. Then, the plural feature points are tracked beyond the frame of the video image.

The image processing apparatus of the present embodiment includes a feature point selector as means for selecting a feature point, a feature point tracker for tracking the selected feature point from a frame to the next frame, and processing means for executing an initial processing and tracking routine, which will be described in detail in the following. In the present embodiment, as the feature point selector and the feature point tracker, the KLT (Kanade-Lucas Tracker) method disclosed in the above-mentioned Non-Patent Document 1 is used. Moreover, the feature point selector, the feature point tracker and the processing means can be implemented by a computer executing a respective predetermined program corresponding to each of them.

Further, in the present invention, the configurations of the feature point selector and the feature point tracker are not limited to the KLT method, but a feature point selector and a feature point tracker of arbitrary configurations can be used as long as they can perform similar functions.

Moreover, for improving the precision of tracking and for avoiding performing tracking a feature point in a background area by mistake, a "foreground detecting technique" utilizing, for example, a background difference method or the like may be used. To put it more specifically, as a method for detecting a foreground, for example, a frame difference, a block difference, a background difference utilizing a Gaussian Mixture Model for obtaining an average of several frames to delete a nonmoving part, or the like can be used.

Figure 1:
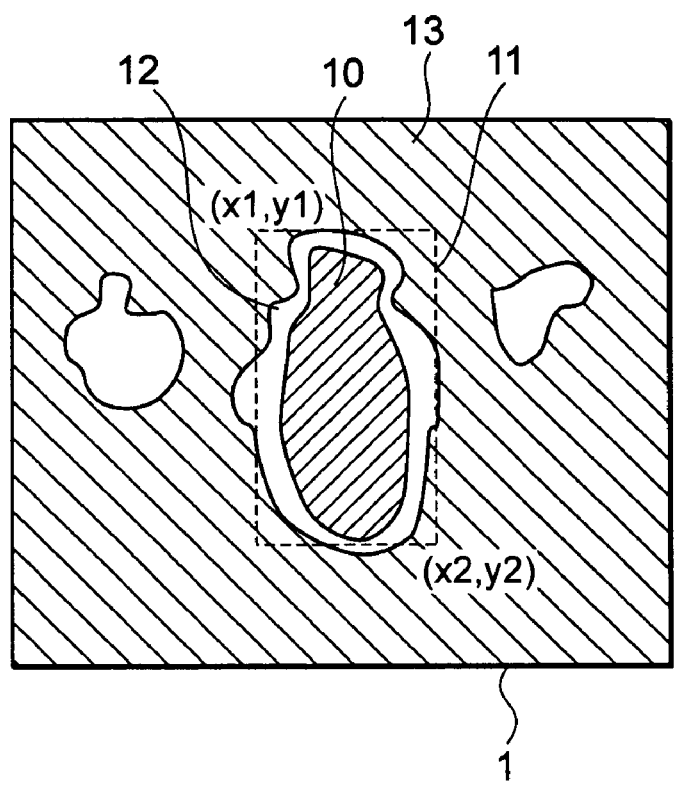
FIG. 1 is an explanatory view showing an example of an image configuration set by the initial processing implemented according to the moving object tracking method of an embodiment of the present invention.

In the moving object tracking method of the present embodiment, as initial processing, as shown in FIG. 1, a tracking area 11 corresponding to a moving object 10 to be a tracking object is set. Hereupon, the moving object 10 is, for example, a person or the like appearing in an initial frame 1 of a video screen. The tracking area 11 shown in FIG. 1 indicates an initial state, and is a rectangular area defined by two points of (x1, y1) and (x2, y2) in the present example. Reference numerals 12 and 13 in FIG. 1 denote a foreground area and a background area of the initial frame 1, respectively, which are extracted by a predetermined foreground detecting method such as a background difference method.

Incidentally, in the present invention, the shape of the tracking area 11 is arbitrary, and is not limited to a certain specific shape.

By the initial processing as mentioned above, the following input data to be used in the moving object tracking method of the present embodiment can be obtained.

(1) an input frame obtained from a video image;

(2) a position of a tracking area (coordinates of an area angle position in the present example);

(3) the total number Nf of the feature points to be selected; and (4) a foreground detection result.

Figure 2:
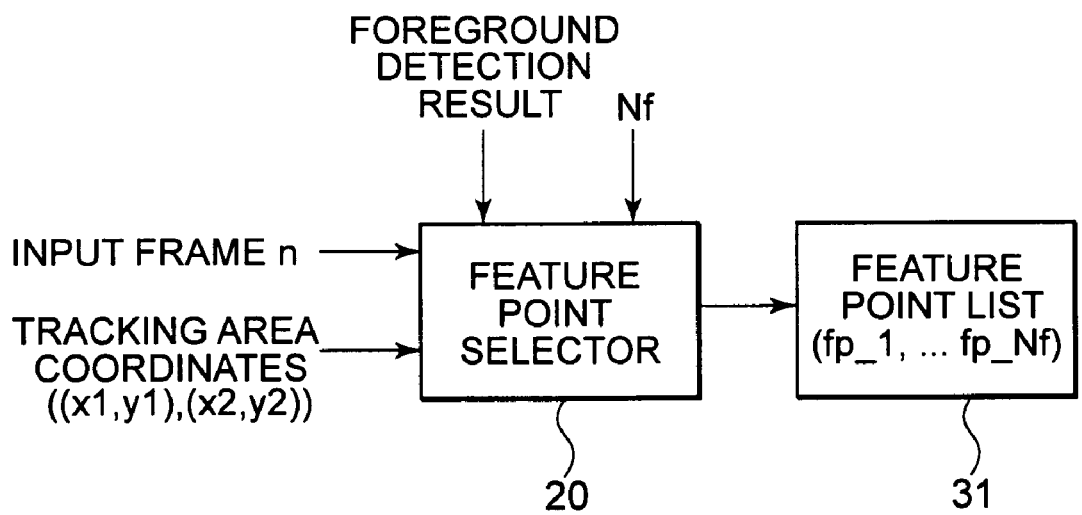
FIG. 2 is an explanatory view showing an example of a feature point selecting process in the initial processing.

The result of the initial processing is inputted into a feature point selector 20 as shown in FIG. 2. The feature point selector 20 outputs a feature point list (FpsL) 31 on the basis of these inputs. The feature point list 21 includes feature points of up to Nf selected in the tracking area 11 in the input frame. However, by some foreground detecting techniques used here, all of the feature points are not always set in the moving object 10 of the tracking object.

Moreover, in the case where the feature point selector 20 cannot set the Nf feature points, the selection is performed in order that as many as possible of the resource frames for feature points remaining at the point of time may be assigned to the feature points in the moving object 10 at the point of time of the end of each cycle of a tracking routine, which will be described in detail in the following.

Figure 3:
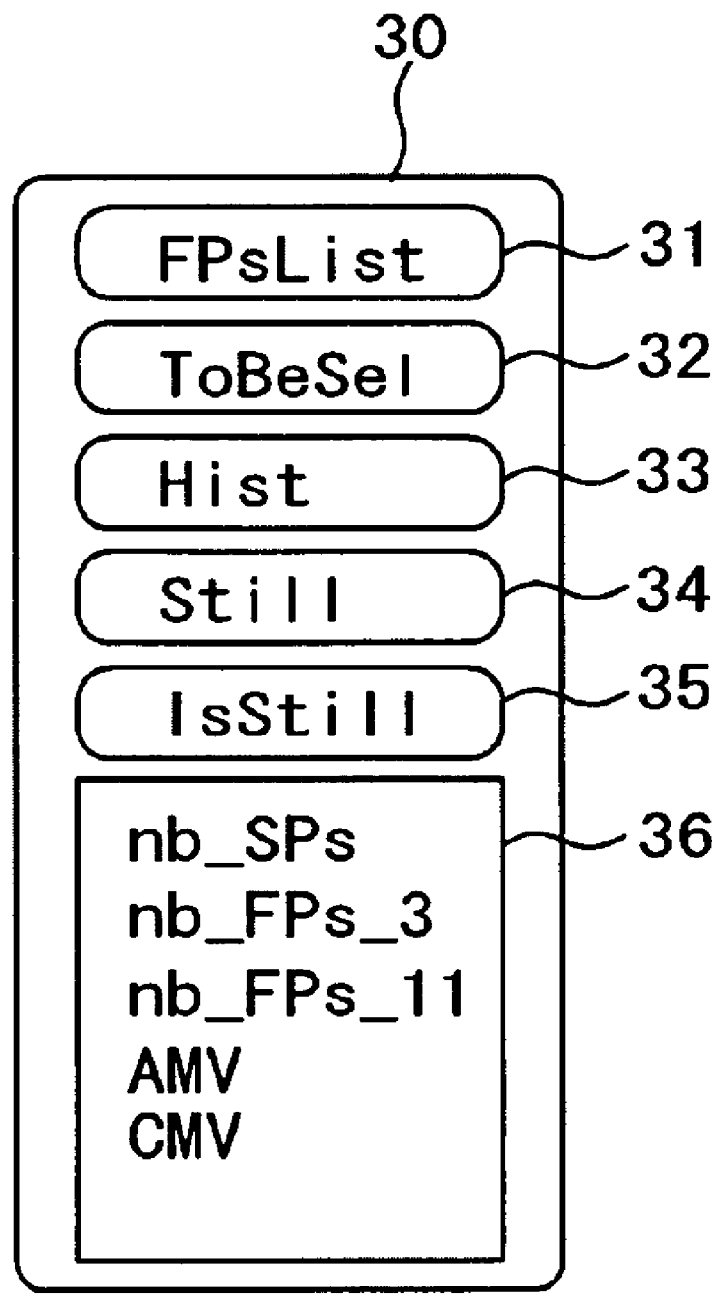
FIG. 3 is an explanatory view showing an example of data to be recorded as a tracking area parameter.

Data 30 (tracking area data 30) pertaining to the tracking area 11 includes the following data as shown in, for example, FIG. 3.

(1) FPsList 31: a list of feature points to be tracking objects;

(2) ToBeSel 32: a list of resource for feature points which have not selected yet, feature points will be assigned to them by update processing of the tracking routine, which will be described in the following;

(3) Hist 33: the tracking history of each feature point. The tracking history Hist (fp_k) of a feature point k is the number of frames in which the tracking of the feature point is continuously succeeded by the feature point tracker, and the tracking history Hist (fp_k) is used as the reliability of the feature point;

(4) Still 34: the still history of each feature point. The still history Still (fp_k) of the feature point k is the number of frames in which the feature point is continuously detected as a still point;

(5) IsStill 35: data indicating whether or not a feature point is standing still. The IsStill (fp_k) becomes "true" when the feature point k is detected as a still point, and indicates "false" at a time other than the time of the detection;

(6) data 36;

(6-1) nb_SPs: the number of the still points in the tracking area 11;

(6-2) nb_Ps_x: the number of feature points where tracking is continuously succeeded over x or more frames. In the present embodiment, the numbers nb_FPs_3 and nb_FPs_11 of the feature points which can be continuously tracked for three frames or more or eleven frames or more, respectively, are used;

(6-3) AMV: average motion vector of the tracking area 11 calculated in the present frame, which indicates the motion from the preceding frame to the present frame; and (6-4) CMV: center of gravity of motion vector of the tracking area 11 calculated in the present frame, indicating the motion of the preceding frame to the present frame.

Incidentally, in the data 36 of the present embodiment, in addition to the above-mentioned data, for example, the maximum number Nf of the feature points set in the above-mentioned initial processing is included.

After the above-mentioned initial processing, a tracking routine for detecting the motion of the tracking area by tracking the selected feature point is implemented. The present tracking routine is repeatedly implemented at every frame of a video image by, for example, a procedure shown in the flowchart of FIG. 4. The present tracking routine includes four main processes.

A first process is a tracking process 40, and the feature point tracker is mainly used. At the present process 40, feature points are tracked at Step 401, and the history of each feature point is updated according to the tracking result thereof at Step 402. The feature points which are not used and unnecessary feature points are deleted at Step 403.

The next process is an occlusion detecting process 41. In the motion detecting process 41, the number of still points nb_SPs is calculated at Step 411, and an occlusion value indicating the existence of the occurrence of occlusions is calculated by the use of a calculation result of the number of still points and the other parameters nb_SPs, nb_FPs_3, nb_FPs_11 or the like at Step 412. Then, a deleting process of the feature points detected as the still points is performed at Step 413.

Moreover, a motion calculating process 42 is implemented. In the motion calculating process 42, the motion of the tracking area 11 is calculated by the use of the result of the occlusion detecting process 41 and the information pertaining to the motion obtained at the preceding cycle of the present tracking routine at Step 421, and the inertia pertaining to the motion of the tracking area 11 is applied at Step 422. Incidentally, the "application of the inertia" in the present specification signifies to adjust the synthesizing ratio of the present motion to the past motion according to the degree of occlusion in the case where there is the possibility that the precision of the calculation of the present motion at the time of the calculation of the present motion becomes low owing to the occurrence of an occlusion, on the supposition that the past motion and the present motion are related strongly. At the end of the motion calculating process 42, the position of the tracking area 11 is updated on the basis of the calculated motion at Step 423.

At the end of the present tracking routine, an updating process 43 at Step 431 is implemented. In the present updating process 43, the feature points which are not tracked, i.e. the feature points the tracking of which is unsuccessful, are deleted, and new feature points are assigned or selected to the resource frames for the un-selected feature points. After that, the tracking routine returns to the first tracking process 40 of the present tracking routine, and new process cycle is started.

In the present embodiment, as the feature point selector 20 in FIG. 2, one having an arbitrary configuration can be used as long as it can select a feature point. For example, a method for calculating a local covariance matrix to search a T point or an X point like the above-mentioned KLT (Kanade-Lucas Tracker) method may be used. At the time of the selection of feature points in the present embodiment, it is preferable that the selected feature points do not converge at a specific position but are dispersed over the whole of the tracking area 11 or are uniformly distributed in the whole of the tracking area 11. The reason is that, even if many feature points exist near to the same spot, it makes no sense, and that it is necessary to track the motion of the whole tracking area 11 more accurately. In the present embodiment, the selection is performed so that the interval between two feature points is equal to or more than a predetermined interval. Incidentally, the predetermined interval may be a fixed value or a value which changes dynamically. In the case where the dynamically changing value is used, for example, the value is made to be changed timewise or spatially, or is made to be changed according to the situation of the process at the point of time or the occurrence of an event such as an occlusion.

At Step 401 of tracking a feature point, a feature point tracker is used, and tracking is performed in every feature point registered in the above-mentioned feature point list at the present point of time. In the present embodiment, the method for realizing the feature point tracker is not especially limited, but, for example, a gradient method such as the above-mentioned KLT method, or a Brute Force Block Matching method is used. The tracking step 401 is implemented in each feature point along, for example, a procedure as shown in FIG. 5.

Figure 5:
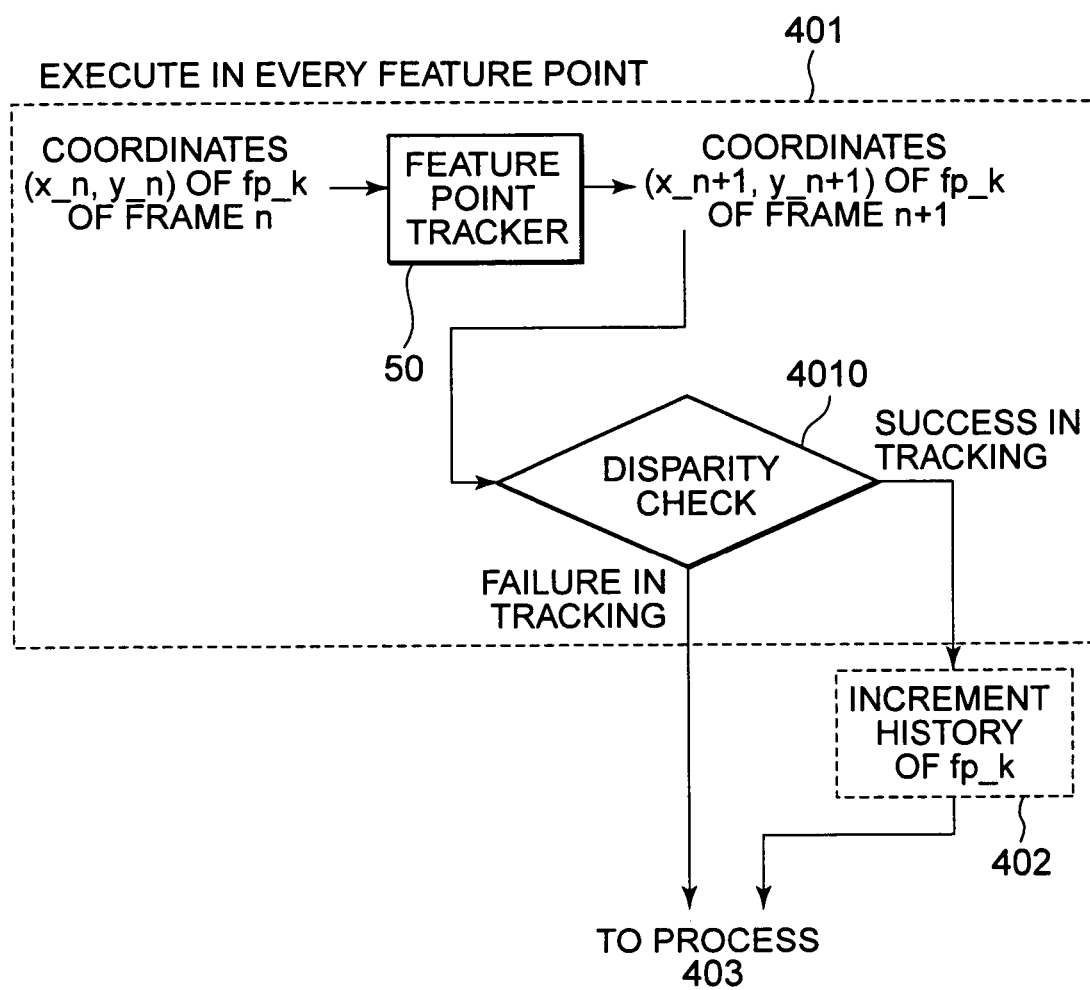
FIG. 5 is an explanatory view showing examples of the tracking process 401 of a feature point in the example of FIG. 4 and the feature point history updating processing 402.

At the tracking step 401 shown in FIG. 5, a feature point tracker 50 performs the tracking of a feature point k(fp_k) located at coordinates (x_n, y_n) in a frame n, and obtains a coordinate position (x_n+1, y_n+1) at the next frame n+1. Next, a disparity check at Step 4010 for detecting whether or not the present tracking successes is implemented.

The present disparity check is performed by using, for example, the block difference method (block subtraction). In more specific terms, a minute area close to a feature point in the preceding frame (before a tracking process) and an area corresponding to the former area in the present frame (after the tracking) are compared, and an absolute value of the total of the difference per a pixel in both the areas is calculated. In the case where the result of the calculation is larger than a predetermined threshold value, the corresponding tracking process is judged to be unsuccessful, and in the other cases, tracking is judged to be successful. Incidentally, the predetermined threshold value maybe a fixed value. Moreover the predetermined threshold value may be a dynamically changing value. In the case where the dynamically changing value is used, for example, the value may be timewise or spatially changed, or may be changed according to the occurrence of an event such as the situation of the process at the point of time or an occlusion.

In the case where the tracking step 401 has succeeded, the tracking routine proceeds to the history updating step 402, and the history of the feature point k is incremented as follows.

$$\text{Hist}(fp\_k) \leftarrow \text{Hist}(fp\_k)+1$$

Figures 6, 7:
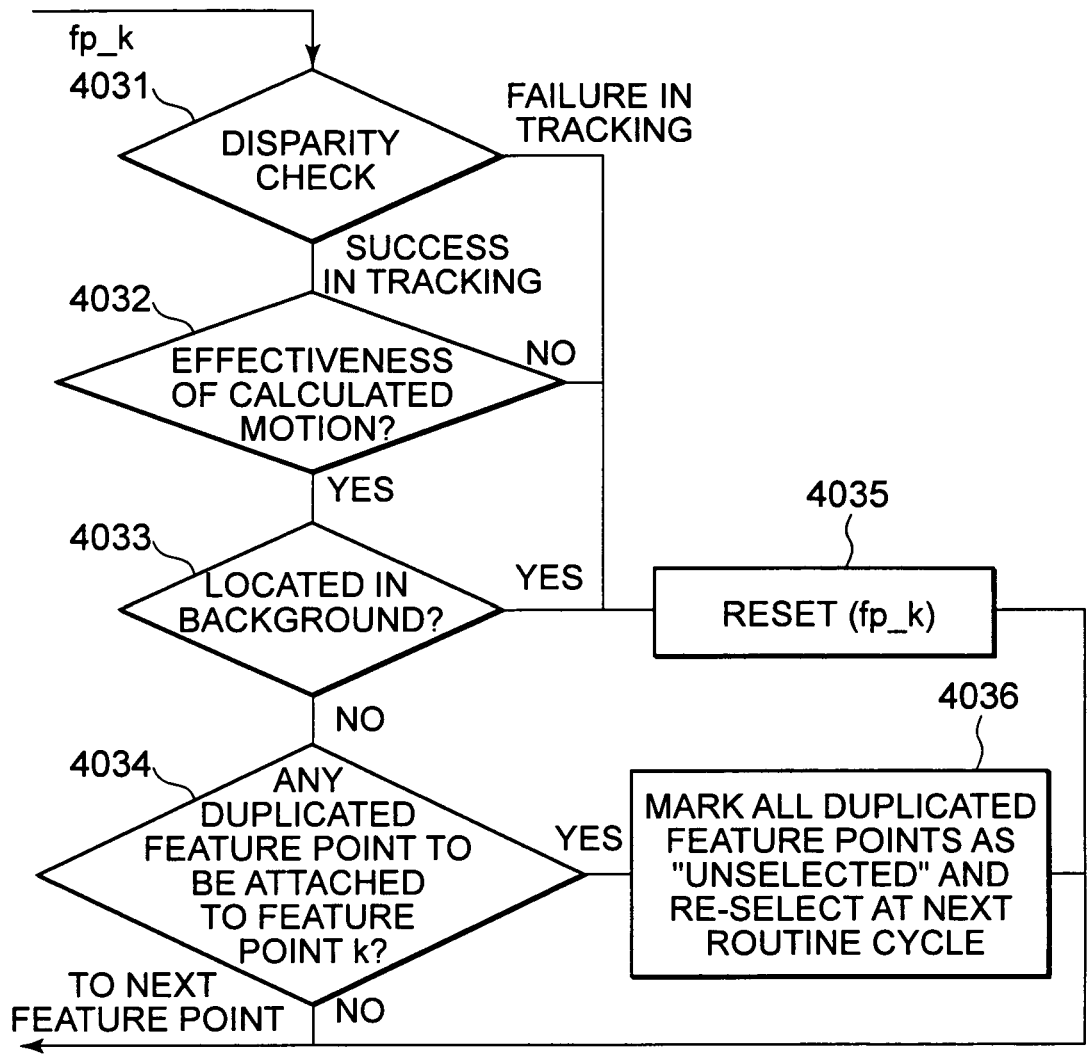
FIG. 6 is an explanatory view showing an example of the unnecessary feature point deleting process 403 in the example of FIG. 4.
FIG. 7 is an explanatory view showing an example of a resetting process shown at Step 4035 of FIG. 6.

At the unused feature point deleting step 403, for example, as shown in FIG. 6, various checks are performed in each feature point, and whether or not the corresponding feature points should be reset is judged. That is to say, by these checks, which resource frame for a feature point a new feature point should be assigned to is judged at the end of the present tracking routine. In the present embodiment, for example, the following checks are implemented.

(1) Whether or not the tracking of the feature point k is succeeded is checked by utilizing the result of the disparity check performed at Step 4010 in FIG. 5 at Step 4031.

(2) By judging whether or not the calculated motion of the feature point k is beyond the previously set maximum displacement, the effectiveness of the motion is checked at Step 4032.

(3) Whether or not the feature point k is located in a background area is checked at Step 4033.

(4) Whether or not a plurality of feature points are located at the same position is checked at Step 4034.

At the Steps 4031 and 4032, it is aimed to judge whether or not tracking has suitably succeeded. The Step 4033 is performed for deleting noises in the tracking process. The Step 4034 is a process in the case where a plurality of points that exists different positions before tracking has joined together after the tracking.

As a result of the checks at Steps 4031 to 4033, as to the feature points which are judged to be unnecessary, the tracking routine proceeds to Step 4035 to implement a resetting process. In the present resetting process, for example, as shown in FIG. 7, the tracking history and the still point history are reset. Then, an IsStill label is set to be "false", and a ToBeSel label is set to be "true".

Moreover, in the case where the plurality of feature point is judged to exist at the same position at Step 4034, the tracking routine proceeds to Step 4036 to reset all of the feature points except one point. Because each reset feature point i has been produced by the joining of the plurality of points, the feature point i includes a still history Still(fp_i) and a tracking history Hist(fp_i).

As a method for determining a feature point to be left among a plurality of feature points located at the same position, for example, various methods exist as follows.

(1) selecting a feature point having the shortest history (prioritizing the latest feature point);

(2) selecting a feature point having the longest history (prioritizing the oldest feature point);

(3) selecting a feature point having the shortest still history (deleting the feature point later); and (4) selecting a feature point having the longest still history (deleting the feature point immediately).

In the present embodiment, a feature point does not become an object of deleting until the point of time when the still history thereof gets to have three frames. Consequently, according to the method (3), the selected feature point is not deleted until the still history gets to have three frames after the selection. Moreover, because by the method (4) the possibility that the selected feature point has already had the history of several frames or more at the point of time of the selection is high, the feature point becomes an object of deletion in a comparatively short period.

In the present embodiment, the methods (1) and (4) are used among the methods, and thereby unnecessary feature points among a plurality of feature points existing at the same position are promptly removed while suppressing their influences to minimum.

Figure 8:
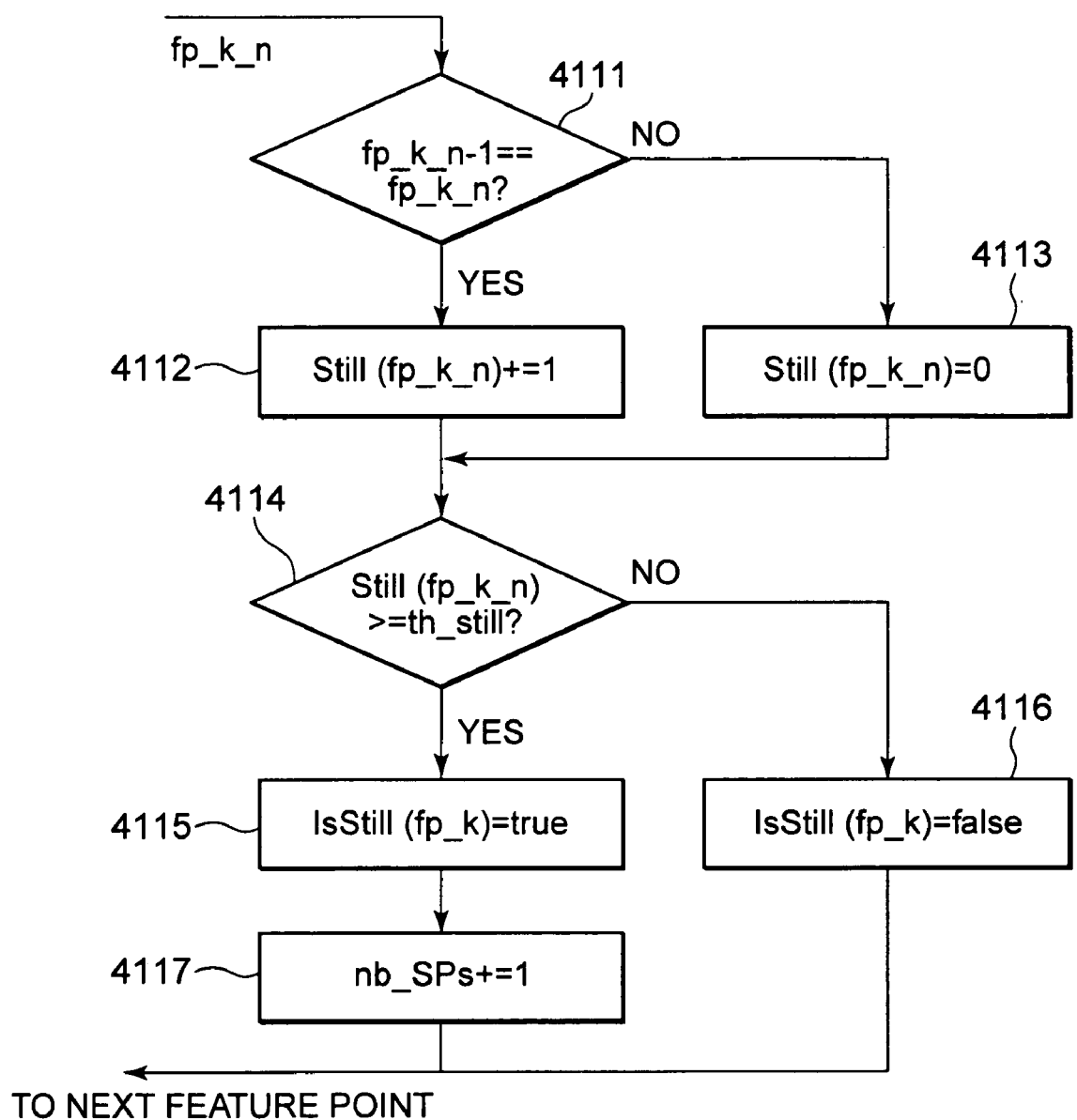
FIG. 8 is an explanatory view showing an example of the still point counting process 411 in FIG. 4.

Next, the occlusion detecting process 41 (see FIG. 4) is performed. In the present occlusion detecting process 41, first, the number of still points is counted at Step 411. The present count process is implemented in every feature point registered in the feature point list of the frame n along, for example, a procedure shown in FIG. 8. Hereupon, a mark fp_k_n indicates coordinates of the feature point k in the frame n. In the count process of FIG. 8, the coordinate position of each feature point in the present frame n and the coordinate position thereof in the preceding frame n−1 are compared at Step 4111. In the case where both the positions are the same or the difference between them is equal to or less than a predetermined threshold value, the feature point is judged to be a still point, and Still (fp_k) is incremented at Step 4112. When the Still(fp_k) is equal to or more than the predetermined value at Steps 4114 and 4115, namely when the feature point k is judged to be standing still over the number of predetermined frames, the present feature point is set to be a still point at Step 4115, and the total number of the still points nb_SPs is counted up at Step 4117.

Incidentally, in the present embodiment, the judgment of the still point is performed by the use of the predetermined threshold value. Hereupon, it is supposed that the threshold value is fixed in this embodiment, but the threshold value is not necessary to be fixed in the present invention. The present invention may be configured to change the threshold value dynamically. In the case where the threshold value is dynamically changed, the threshold value is changed, for example, timewise or spatially, or is changed according to the situation of the process at the point of time or the occurrence of an event such as an occlusion.

Next, an occlusion value for presuming the existence of the occurrence of an occlusion is calculated at Step 412. It is found that the number of feature points changes when an occlusion occurs. In particular, in the case where the feature points other than the feature points being still points are grouped according to the periods during which the tracking of the feature points succeeds, it is known that the number of the feature points decreases with the occurrences of the occlusions in almost all of the groups. The present invention aims to detect the occurrences of the occlusions at a high precision by utilizing the changes of the number of the feature points among different groups and the simultaneity of the changes of the numbers among the groups.

Incidentally, in the case where the moving object is standing still or begins to stand still, the number of the still points increases, and the number of the points which are compulsorily reset also increases. As a result, an occlusion value, which will be described in the following in detail, increases, and an erroneous detection occurs. Moreover, in the present embodiment, inertia is applied by the use of the occlusion value. Consequently, there is a case where a tracking area moves owing to a high occlusion value which is calculated by mistake, though the tracking area really stands still. For preventing the occurrence of such the erroneous movement, the present embodiment is configured to control an occlusion value by the use of the information pertaining to the number of still points.

In the present embodiment, an occlusion value is introduced as a variable for indicating the height of the possibility of the occurrence of an occlusion or the degree of an occlusion (overlapping). Moreover, in the present embodiment, the occlusion value is defined so that the occlusion value does not only indicate the existence of the occurrence of an occlusion in an alternative way, but also the occlusion value continuously changes according to the degree of overlapping. In the case where an occlusion value is normalized to be set to change between 0 to 1 according to the degree of the occlusion like the example of the present embodiment to be described in detail in the following, the maximum value 1 signifies that it is considerable to be sure that an occlusion occurs. On the other hand, the minimum value 0 of the occlusion value signifies that no occlusions occur.

Figure 9:
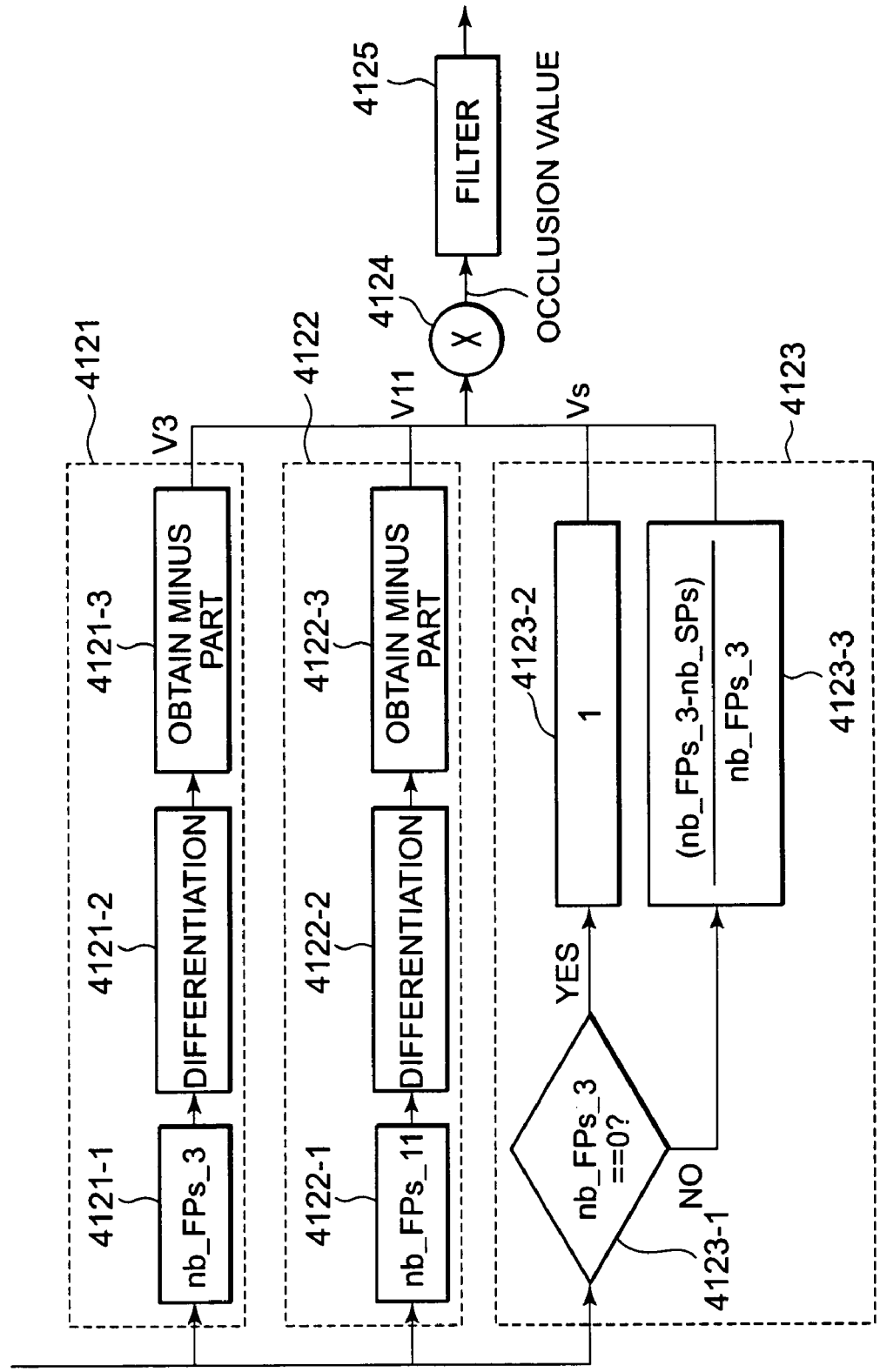
FIG. 9 is an explanatory view showing an example of the occlusion value calculating process 412 in FIG. 4.

In the present embodiment, an occlusion value is calculated along, for example, the procedure shown in FIG. 9 by the use of the history of each of the calculated feature points and the total number of the still points.

Incidentally, in the present invention, the method for calculating the occlusion value is not limited to the process of FIG. 9. For example, the other processing method may be used as long as the method is one by which the existence of the occurrence of an occlusion or the degree of the occlusion (overlapping) can be presumed by utilizing at least the increase and decrease of the feature points.

In the process of FIG. 9, first, the number nb_FPs_3 of the feature points the tracking of which succeeds over three frames or more continuously and the number nb_FPs_11 of the feature points the tracking of which succeeds over eleven frames or more continuously are calculated by the use of the parameter His ( ) at Steps 4121-1 and 4122-1.

Next, signals indicating the numbers nb_FPs_3 and nb_FPs_11 of the feature points are differentiated at Steps 4121-2 and 4122-2. The values of parameters negative_part indicating the minus parts of the differentiated values are obtained by, for example, the following formula.

negative_part($x$)<-- max(−$x$, 0)

For surely understanding a phenomenon in which the number of the feature points the tracking of which is correctly performed abruptly decreases in the case where an occlusion occurs, in the present embodiment, the values of the minus parts of the differentiations obtained as to each of the number nb_FPs_3 of the feature points the tracking of which succeeds over three frames or more continuously and the number nb_FPs_11 of the feature points the tracking of which succeeds over eleven frames or more continuously are multiplied by each other at Step 4124.

Incidentally, at Steps 4121-3 and 4122-3 for obtaining the minus parts, a normalizing process for making the obtained values of the minus parts to be ones between 0 and 1 is also performed. In the normalizing process, for example, 40% of the total number of the tracked feature points is set as the maximum value of the number nb_FPs_3. That is to say, an output V3 from the whole of Step 4121 can be obtained by the following formula when the total number of the tracked feature points is denoted by nb_trackedFP.

$$V3 \leftarrow \max(1.0, V3/(0.4 * nb\_trackedFP))$$

Moreover, an output V11 obtained from Step 4122 to the number nb_FPs_11 is normalized by setting 25% of the total number of the tracked feature points until now as the maximum value.

Incidentally, although 40% and 25% of the total numbers of the feature points are used as the maximum values of the output signals V3 and V11 in the example of the present embodiment, the maximum values of outputs usable in the present invention are not limited to those percentages. The other values may be used as long as the value is one by which the calculation of an occlusion value indicating the existence of the occurrence of an occlusion and the degree of the occlusion can be performed in consideration of operating conditions and the like. Moreover, the maximum values and the minimum values of the output signals may be fixed values, or may be dynamically changing values. In the case where the dynamically changing values are used, for example, the values are timewise or spatially changed, or they are changed according to the situation of the process at the point of time or the occurrence of an event such as an occlusion.

Moreover, in the case where the moving object of an tracking object is standing still, the number of still points increases and the number of the points to be deleted also increases. Consequently, at the time of the detection of an occlusion, it is preferable to consider the number of still points, too. Accordingly, in the present embodiment, at the time of the calculation of an occlusion value, a signal SV corresponding to the number of the still points, which is described in the following, is multiplied in addition to the signals V3 and V11.

The signal SV is calculated at, for example, Step 4123 of FIG. 9. At the present Step 4123, first, it is judged whether or not the number nb_FPs_3 of the feature points the tracking of which succeeds for at least three frames or more continuously is 0 at Step 4123-1. When the number nb_FPs_3 is 0, the value of the signal SV is set to be 1 at Step 4123-2. When the number nb_FPs_3 is not 0, the number nb_SPs of the still points is normalized by using the number nb_FPs_3 at Step 4123-3. Hereupon, the still points are ones the tracking of which has succeeded for at least th_still frames or more continuously. In the example shown in FIG. 9, th_still=3, and accordingly the number nb_FPs_3 is used for the normalization.

Moreover, in the present embodiment, the output of the Step 4124, i.e. occlusion value (Occlusion Measure), is processed by a filter 4125. The filter 4125 delays changes in the direction of decreasing in order that an actually calculated occlusion value does not abruptly change even when the occlusion value decreases. To put it specifically, the filter process is performed by, for example, a process shown in the following.

```
if
    (occlusion_measure>=previous_occlusion_measure)
then
    occlusion_measure=occlusion_measure;
else
    occlusion_measure=0.8×occlusion_measure+0.2×
        previous_occlusion_measure;
previous_occlusion_measure=occlusion_measure;
```

Incidentally, instead of smoothing the decrease changes of occlusion value (measure) by the use of the filter 4125, the configuration may be one for calculating final occlusion values by utilizing of detection results by means provided for detecting the occurrence and the end of an occlusion severally.

Incidentally, in the calculation of the occlusion value, the number nb_FPs_3 of the feature points the tracking of which has succeeded for three frames or more continuously and the number nb_FPs_11 of the feature points the tracking of which has succeeded for eleven frames or more continuously are set to be used. However, the configuration capable of being used for the calculation of the occlusion value in the present invention is not limited to those ones. In the case where an occlusion occurs, the number of all kinds of the feature points decreases independently of the number of the frames the tracking of which has succeeded until now (the length of a tracking period). Accordingly, for example, only either of nb_FPs_3 and nb_FPs_11 may be used. Moreover, the numbers of the feature points the tracking of which has succeeded for arbitrary numbers of frames continuously and the combinations of the numbers may be used instead of the numbers nb_FPs_3 and nb_FPs_11 as long as the numbers or the combinations are ones which express the changes of the numbers when occlusions occur. Hereupon, by utilizing the changes of the number of a plurality of kinds of feature points in addition, more robust occlusion detection is enabled.

Figure 4:
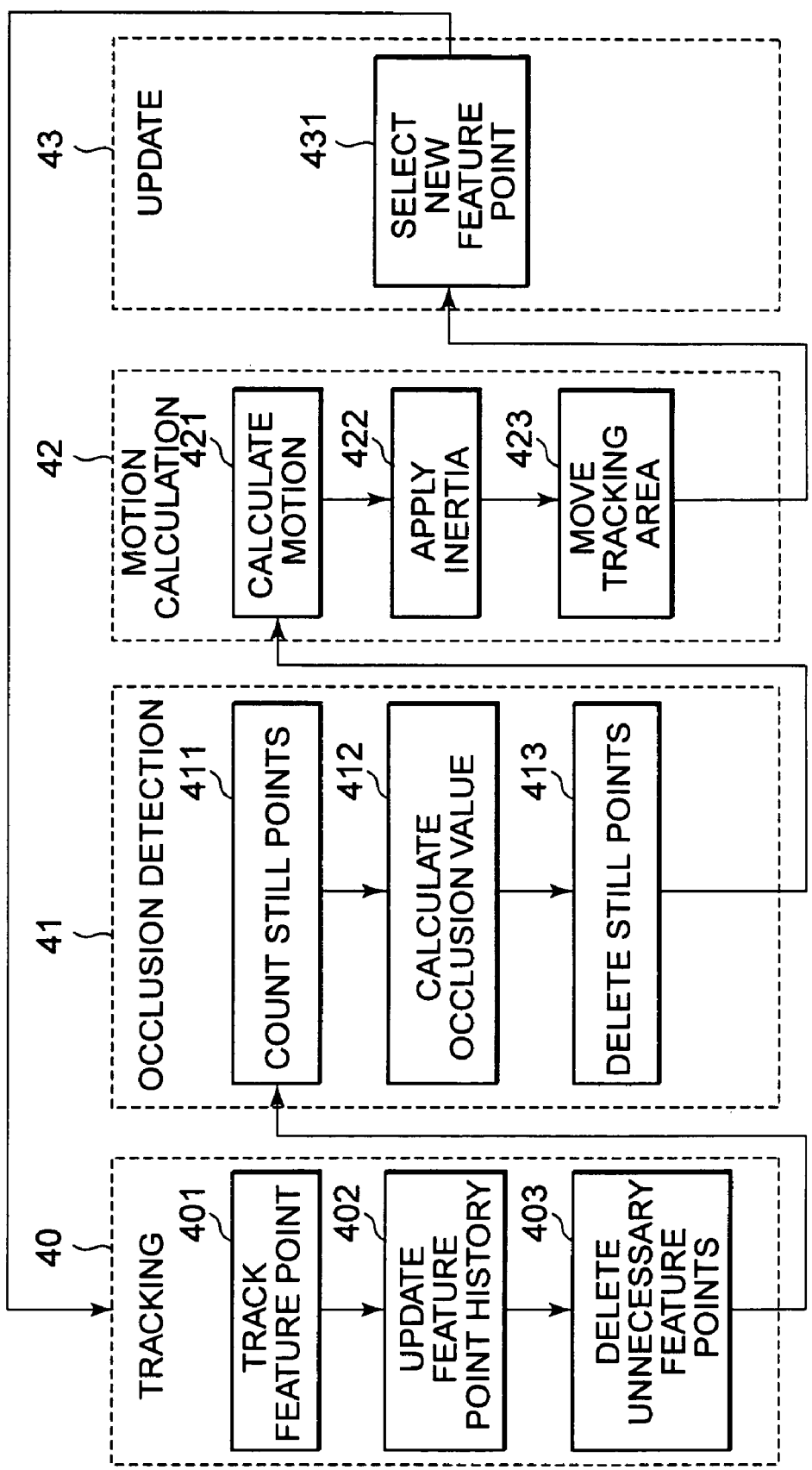
FIG. 4 is an explanatory view showing an example of a tracking routine of the present invention.

Next, a still point deleting process at Step 413 in FIG. 4 is performed. The present deleting process is for preventing that the distribution of feature points abruptly changes in continuous two frames when the moving object as the tracking object stands still.

Figure 10:
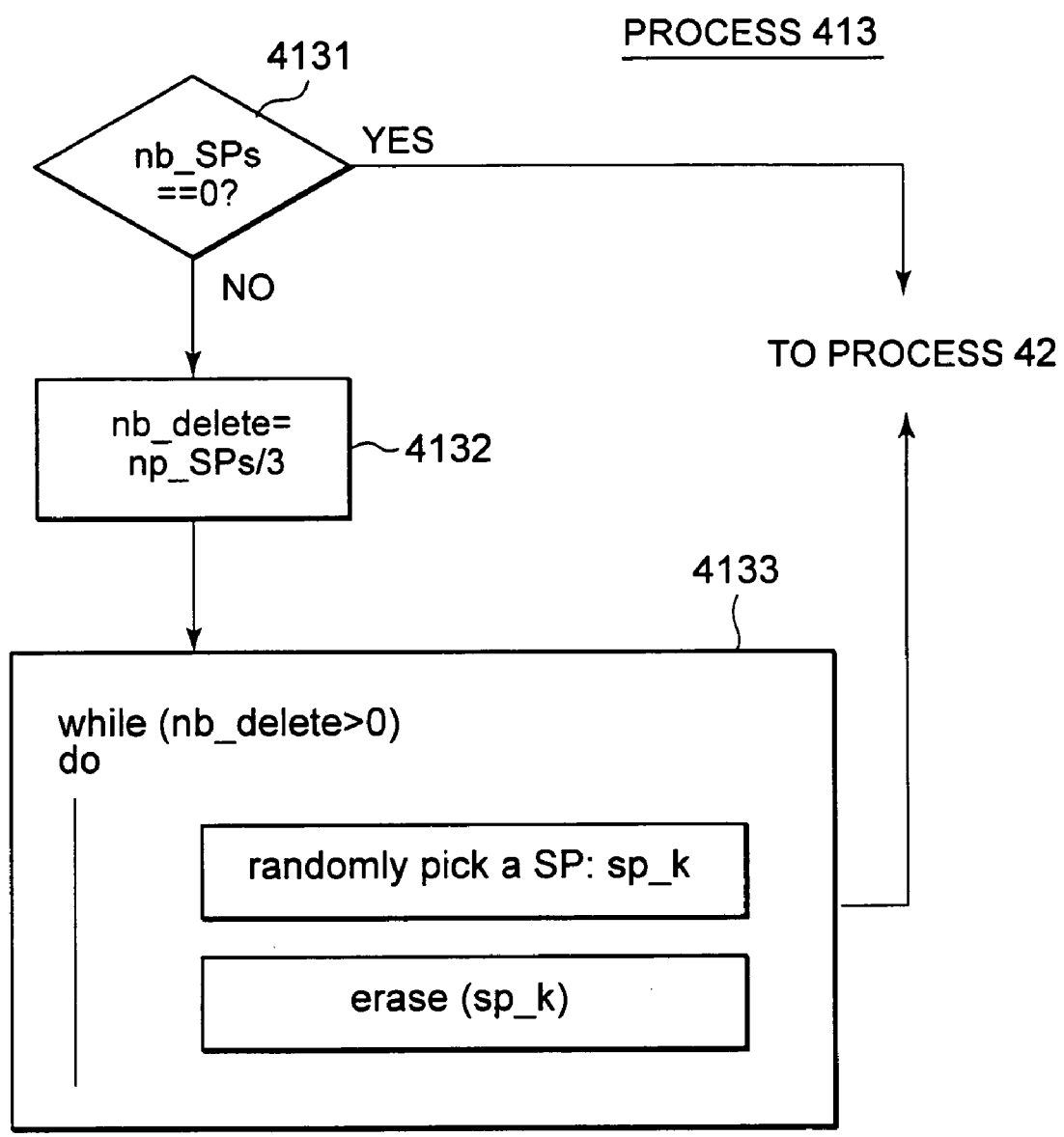
FIG. 10 is an explanatory view showing an example of the still point deleting process 413 in FIG. 4.

In the present embodiment, the deleting process is implemented along, for example, the procedure shown by the flowchart in FIG. 10. In the present process, first, whether the number of still points nb_SPs is 0 or not is judged at Step 4131. In the case where the number nb_SPs is 0, nothing is performed, and the process proceeds to the next process 42 in FIG. 4. In the case where the number nb_SPs is not 0, only a predetermined ratio of the still points among all of the still points is deleted at Steps 4132 and 4133.

Although ⅓ is deleted in the example shown in FIG. 10, the ratio of deleting in the present invention is not limited to the value. Moreover, the ratio may be a fixed value, or may be a dynamically changing value. In the case where the dynamically changing value is used, for example, the value is timewise or spatially changed, or is changed according to the situation of the process at the point of time or the occurrence of an event such as an occlusion. Hereupon, for preventing the generation of large influences to the whole distribution of feature points, it is important that the still points to be deleted are selected so as to be uniformly distributed all over the tracking area.

Next, the motion calculating process 42 is implemented. In the present process 42, first, the motion of the tracking area is calculated at Step 421 in FIG. 4. In the present embodiment, for the improvement of the tracking precision of the moving object, the motion calculating method to be used in the present process is synthesized according to the degree of the occlusions.

Hereupon, the degree of the occlusions indicates the degree of the overlapping of the tracked moving object with the other objects. In the present invention, the degree of the occlusions is denoted by the above-mentioned occlusion value, and a plurality of motion calculating methods is combined to each other according to the occlusion value. Thereby, the motion of the tracking area is presumed at a higher precision.

Figure 11:
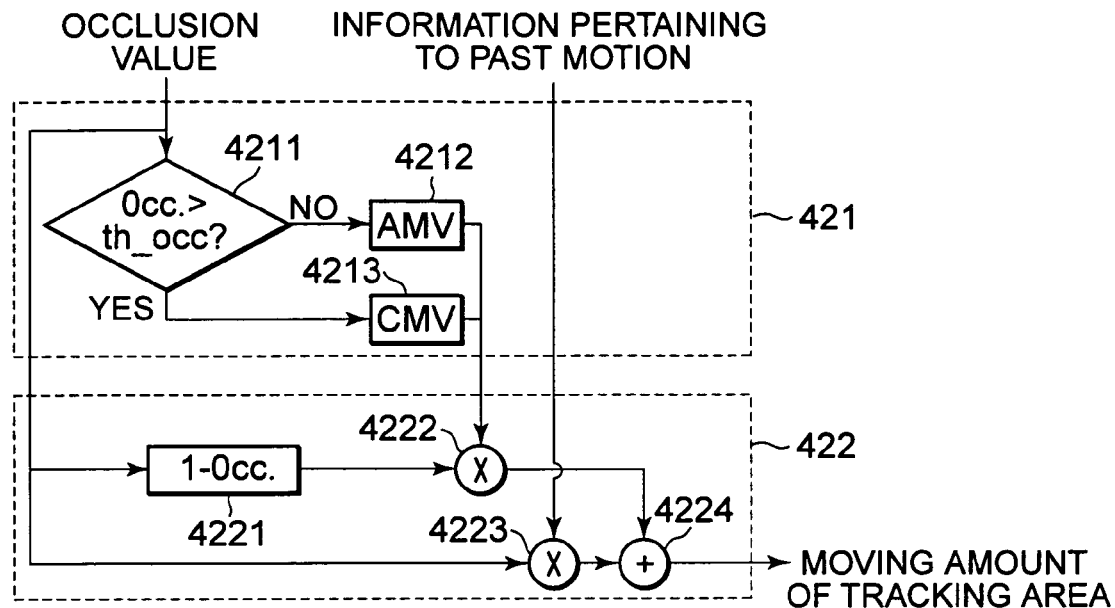
FIG. 11 is an explanatory view showing an example of the motion calculating process 421 and the inertia applying process 422 of FIG. 4.

At the present process 42, for example, as shown in the flowchart of FIG. 11, in the case where the occlusion value (measure) calculated at the process of FIG. 9 is larger than a predetermined threshold value th_occ when Yes at Step 4211, a center of gravity motion vector (CMV), which is considered to be able to presume a motion at a higher precision even if an occlusion occurs, is calculated at Step 4212. In the cases other than that, an average motion vector (AMV) is calculated at Step 4213.

Incidentally, in the present embodiment, 0.05 is used as the threshold value th_occ. The value of the threshold value corresponds to the situation in which an occlusion begins to occur, namely the tracking area and another object begins to overlap with each other. By using the motion calculating method by which the movement of a tracking area can be calculated with a comparatively high degree of precision even when a tracking area and another object overlap with each other before they completely overlappes with each other, the improvement of the calculation precision of a motion is achieved.

Moreover, another arbitrary value may be set as long as the value is one by which the position of a tracking area can be finally presumed with a high degree of precision. Moreover, although two kinds of the motion calculating methods are synthesized to be used in the present embodiment, a configuration in which three or more motion calculating methods different from one another synthesized according to the degree of an occlusion may be adopted.

Figure 12:
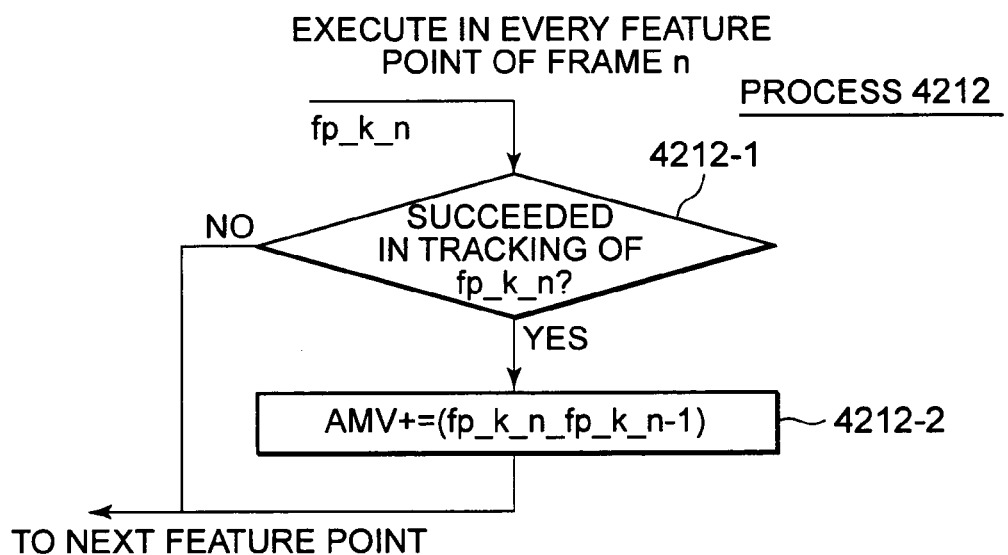
FIG. 12 is an explanatory view showing an example of the average motion vector calculating process 4212 of FIG. 11.

The calculation of the average motion vector (AMV) is implemented in every feature point in the n frame as shown in, for example, the flowchart of FIG. 12. That is to say, whether or not tracking succeeds is judged in every feature point at Step 4212-1. As to the feature points the tracking of which succeeds, their motions from the preceding frame (frame n−1) to the present frame (frame n) are sequentially calculated to be averaged at Step 4212-2.

On the occasion of the averaging process, weighting is also performed according to the reliability of the feature points. The reason of the weighting is the following supposition. That is to say, the following situation can be considered. The reliability of the feature points located on a moving object is high, and their tracking histories are long. On the other hand, the reliability of the feature points located on the background is low, and their tracking histories are short. Accordingly, by performing the weighting according to the tracking histories as described above, the detection of a motion can be performed more accurately.

Figure 13:
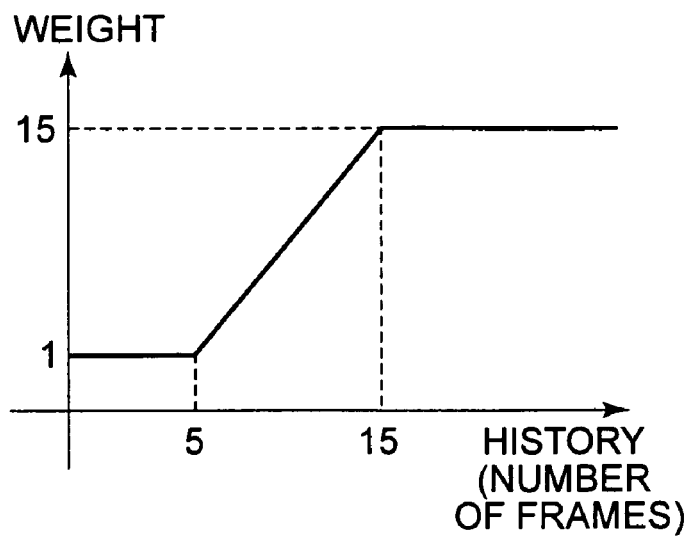
FIG. 13 is a graph showing a relation between the weight and history used by the weighting in the example of the average motion vector calculating process 4212 in FIG. 12.

To put it concretely, for example, as shown in a graph shown in FIG. 13, three areas are formed according to the number of frames (history) the tracking of which succeeds continuously. As to the feature points having histories shorter than a number of predetermined frames, the minimum weight (weight 1 to the histories of five frames or less in the present example) is given. As to the feature points having histories longer than a number of predetermined frames, the maximum weight (weight 15 to the histories of 15 frames or more in the present example) is given. As to the feature points having histories intermediate between them, a weight is given according to the number of their tracked frames. Incidentally, the numbers of predetermined frames may be fixed values, or may be dynamically changing values. In case of using the dynamically changing values, for example, the values are timewise or spatially changed, or are changed according to the situation of the process at the point of time or the occurrence of an event of an occlusion.

Hereupon, the reason why the same weight is evenly given to the feature points having tracking histories shorter than the number of predetermined frames is that a certain degree of time is necessary for deleting all still points. Moreover, there is also the reason of aiming to prevent the still points having longer still histories from having a higher importance than that of a newly selected effective feature point.

Figure 14:
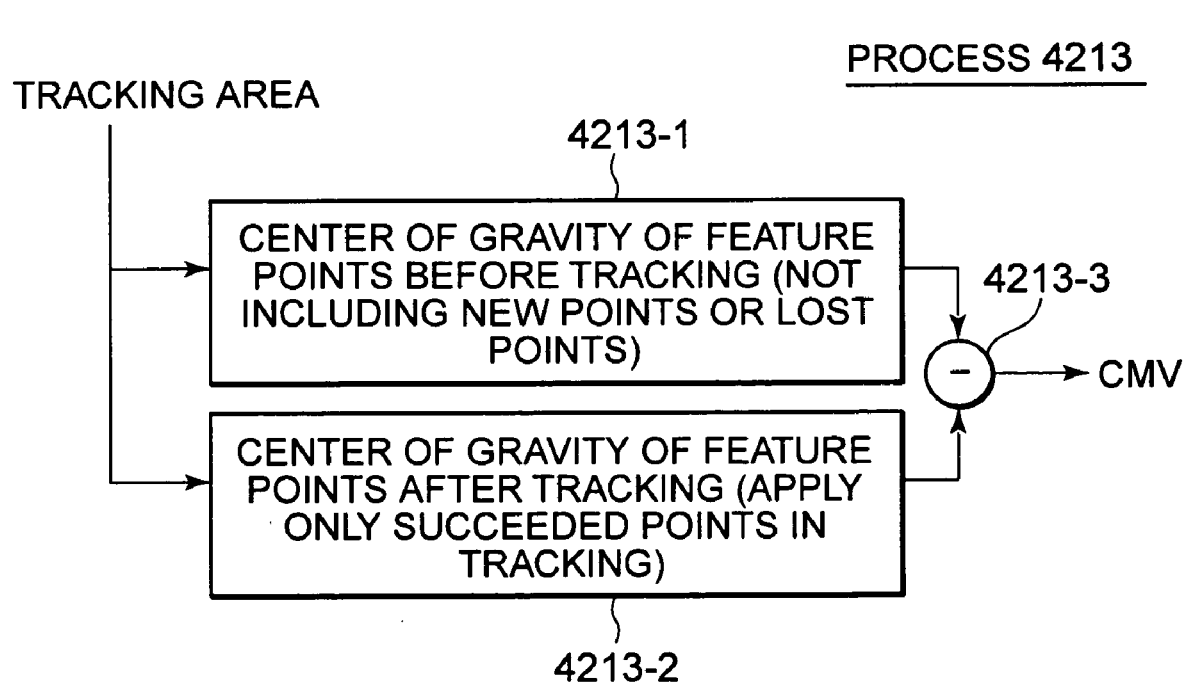
FIG. 14 is an explanatory view showing an example of the center of gravity motion vector calculating process 4213 of FIG. 11.

The calculation of the center of gravity motion vector (CMV) is implemented as shown in, for example, the flowchart of FIG. 14. Also in the present CMV calculating process, similarly to the calculation of the AMV, weighting is performed according to the reliability of feature points. In the calculation of the center of gravity of the feature points before tracking at Step 4213-1, the feature points newly set in the present cycle and reset feature points are excluded. Moreover, in the calculation of the center of gravity of the feature points after tracking at Step 4213-2, only the feature points the tracking of which succeeds are applied. The center of gravity motion vector CMV can be obtained on the basis of the calculated movement of the center of gravity before and after the tracking.

As described above, when the motion vector in the tracking area is calculated, the so-called inertia reflecting the past motion to the calculated motion is next applied in the process 422 in FIG. 11. In the present embodiment, the magnitude of the inertia is determined according to an occlusion value. For example, in the process shown in FIG. 11, the inertia is applied by the following formula, a parameter Applied_Motion indicating the final movement of a tracking area is calculated.

$$\text{Applied\_Motion} = (1 - \text{Occlusion\_Measure}) \times \text{Motion} + \text{Occlusion\_Measure} \times \text{Past\_Motion}$$

Hereupon, the parameter Past_Motion indicates the information pertaining to the past motion, and is obtained by the methods of, for example, the following (i) to (iv). Applied_Motion is a sum of Past_Motion and Motion, and the ratio of the addition is determined according to the occlusion value as described above. The Applied_Motion is a motion really applied to a tracking area. Motion is a motion obtained by the present motion calculating unit, and is a synthesized result of AMV and CMV in the present specification. Incidentally, each parameter is a motion per a unit frame, and substantially indicates a velocity.

(i) Past_Motion_n=Motion_(n−1);

(ii) Past_Motion_n=Applied_Motion_(n−1);

(iii) Past_Motion_n=Average(k=1 . . . N, Applied_Motion_(n−k)); and (iv) Past_Motion_n=Average(k=1 . . . N, Motion_(n−k))

Next, the tracking area is moved according to the calculated Applied_Motion at Step 423 in FIG. 4.

At the end, the updating process 43 in FIG. 4 is implemented. In the present process 43, the feature points out of the tracking area after the movement are reset. Moreover, to the resource frames for feature points assigned to the reset feature points, new feature points are selected by the feature point selector 20. After the end of these selection processes, the process returns to the first tracking process 40 of the present tracking routine.

According to the moving object tracking method of present embodiment, the following features and effects can be obtained.

(1) By updating the feature points considered not to be set in a moving object sequentially by the use of a plurality of feature points, it becomes possible to perform the tracking to the whole tracking area instead of the simple tracking to a feature point as a unit;

(2) By the updates of feature points or the detection of the feature points standing still, the coping with the influences of a background and with the objects standing still becomes possible, and the improvement of the tracking precision becomes possible;

(3) Because the existence of the occurrence of an occlusion is judged by means of the changes of the number of feature points, the detection of the occlusion can be performed with a higher degree of precision; and (4) Because the moving amount is calculated by means of an occlusion value indicating the occurrence of an occlusion or the degree of contribution of a past moving amount is controlled according to the occlusion value, a robust tracking becomes possible even in the case where an occlusion occurs.

Figure 15:
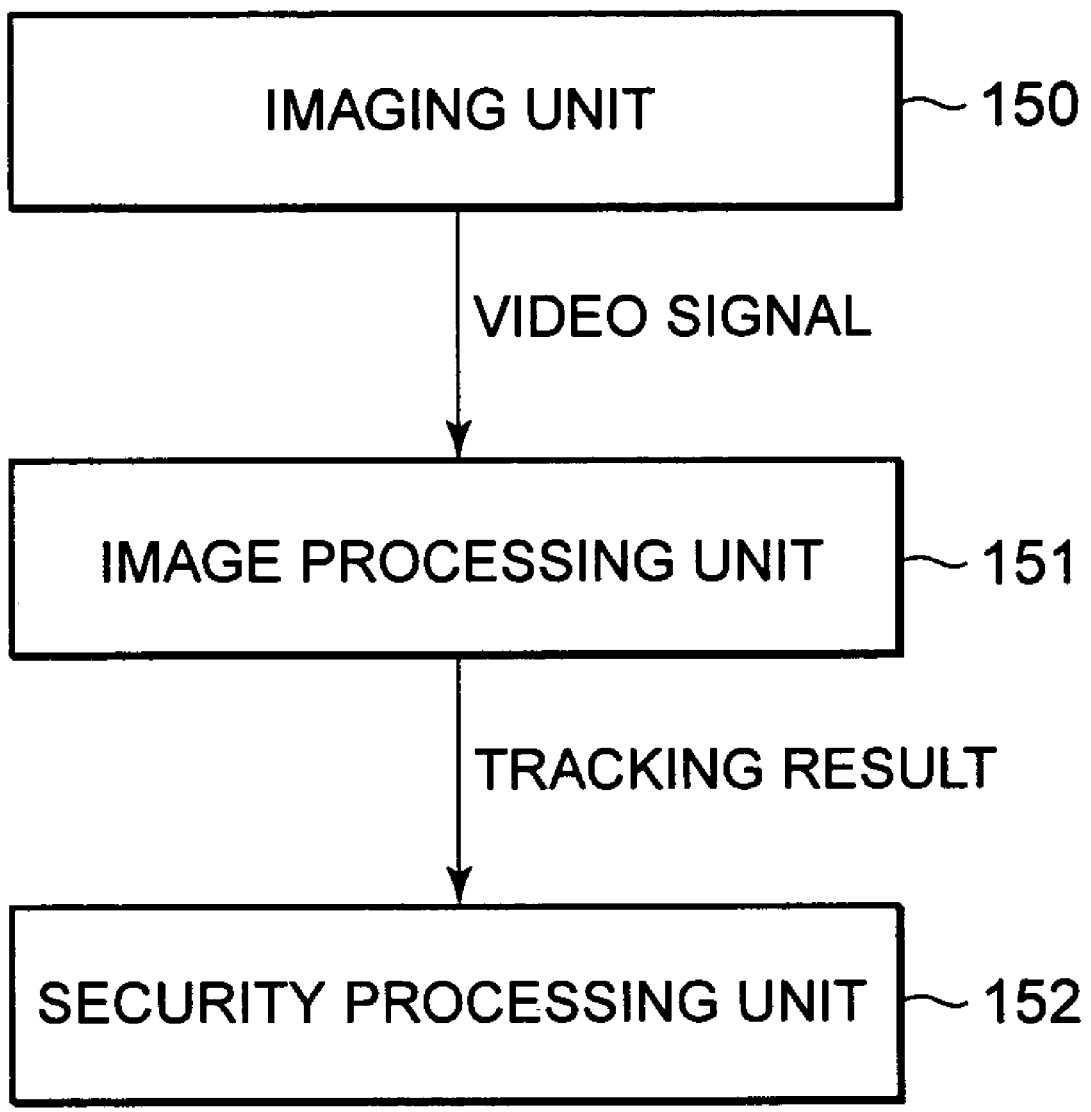
FIG. 15 is a block diagram showing an example of the configuration of a monitoring system according to another embodiment of the present invention.

Next, a monitoring system according to an embodiment of the present invention is described with reference to FIG. 15. The monitoring system of the present embodiment is a system for supporting a monitoring service such as the specification of an invader by tracking a moving object by the above-mentioned moving object tracking method of the present invention.

The present monitoring system includes one or a plurality of cameras, which includes an imaging unit 150 for outputting image information such as a video signal, an image processing unit 151 for receiving the video signal output from the imaging unit 150 and tracking a moving object appearing in a video image on the basis of the moving object tracking method of the present invention to output the result of the tracking, and a security processing unit 152 for receiving the result of the tracking output from the image processing unit 151 to highlight the tracked moving object in the video image or analyzing the result of the tracking to output a warning according to the result of the analysis.

The image processing unit 151 and the security processing unit 152 are realized by making a computer execute a program for implementing the above-mentioned moving object tracking method of the present invention in, for example, a computer system including a computer having a CPU, a memory, a signal interface with an external apparatus, and the like; and a man-machine interface composed of an output apparatus such as a display for performing the interfacing between the computer and a user, and an input apparatus such as a keyboard and a mouse.

According to the monitoring system of the present embodiment, a tracking with a high degree of precision becomes possible even if an occlusion, in which a moving object such as an invader is hided behind another object, occurs, and consequently monitoring can be more efficiently implemented.

Next, a game apparatus according to an embodiment of the present invention is described. The present game apparatus is provided with a game processing unit for controlling the progress of a game in place of the security processing unit 152 in the configuration of the apparatus of the monitoring system shown in FIG. 15, and includes an operating unit for receiving an operation of a user and outputting a corresponding operation signal, and a display unit for indicating an image showing the situation of the game.

The present game apparatus receives a video signal output from an imaging unit such as a camera, and tracks a moving object appearing on a video image on the basis of the moving object tracking method of the present invention. Then, the tracking result is output by the image processing unit. The game processing unit controls the progress of a game on the basis of the tracking result output from the image processing unit and the operation signal of the user output from the operating unit, and displays the situation of the game on the display unit.

Incidentally, in place of the image imaged by the imaging unit, the game processing unit may be configured to use a CG image generated artificially, or to use a synthesized image generated by combining a CG image and a really imaged image.

The image processing unit and the game processing unit are realized by making a computer execute a program and a game program for implementing the above-mentioned moving object tracking method of the present invention, which computer includes, for example, a CPU, a memory a signal interface with an external apparatus, and the like. The operating unit is composed of, for example, a game controller with a joystick. The display unit is composed of, for example, an image display apparatus such as a CRT and an LCD.

According to the game apparatus of the present embodiment, a tracking with a high degree of precision becomes possible even if an occlusion, in which a moving object appearing in an image is hided behind another object, occurs, and consequently the process of a game can be more smoothly controlled.

The present invention can be applied to, for example, an image processing method for tracking a moving object appearing in an image, an image processing apparatus for executing the method, a game machine utilizing the method, and a monitor or a monitoring system utilizing the method.

What is claimed is:

1. An image processing apparatus for performing a tracking of a moving object by setting a tracking area corresponding to a moving object appearing in a video image, by setting a plurality of feature points in the tracking area, and by tracking the plurality of feature points, comprising:

a tracking processing unit configured to track each of the plurality of feature points from the preceding frame to the present frame;

a motion calculation processing unit configured to specify a position of the tracking area in the present frame by estimating the motion of the tracking area based on the tracking result of each of the feature points; and an occlusion detecting unit configured to detect the occurrence of an occlusion of the moving object overlapping with an other object, said occlusion detecting unit calculates an occlusion value indicating the possibility of the occurrence of the occlusion of the moving object by utilizing a change of a number of feature points being successfully tracked, wherein said tracking processing unit calculates a reliability indicator indicating that a feature point has been tracked in the moving object for each of the feature points; and said motion calculation processing unit calculates the motion of the tracking area using the reliability indicator of each feature point and the occlusion value; wherein said occlusion detecting unit sets a plurality of groups of feature points among the feature points based on the respective reliability indicators; and said occlusion detecting unit calculates the occlusion value based on a change of the number of the feature points being successfully tracked among different groups of the plurality of groups of the feature points.

2. The image processing apparatus as cited in claim 1, wherein said reliability indicators indicate the period during which each feature point has been tracked in the moving object.

3. The image processing apparatus as cited in claim 2, wherein said reliability indicators indicate a history which reflects the number of frames in which tracking continuously succeeds for each feature point.

4. The image processing apparatus as cited in claim 1, further comprising:
 a selection processing unit configured to select a feature point, wherein
 said tracking processing unit detects the changes of a position before and after tracking to detect a still point among the feature points the tracking of which succeeds on the basis of a detection result; and
 said selection processing unit selects a new feature point to replace a subset of the feature points among the detected still points.

5. The image processing apparatus as cited in claim 1, further comprising:
 a selection processing unit configured to select a feature point, wherein
 said tracking processing unit judges whether or not the selected feature point is suitable for tracking; and
 said selection processing unit selects a new feature point in place of the feature point which is judged not to be suitable.

6. The image processing apparatus as cited in claim 1, wherein
 said motion calculation processing unit includes a plurality of motion calculating units different from each other and configured to calculate the motion of the tracking area to synthesize the plurality of motion calculating units according to the occlusion value.

7. The image processing apparatus as cited in claim 1, wherein
 weighting is performed according to the reliability indicator of each of the feature points at the time of the calculation of the motion by the motion calculation processing unit.

8. The image processing apparatus as cited in claim 1, wherein
 said motion calculation processing unit calculates the motion of the tracking area using information pertaining to the past motion of the tracking area.

9. A moving object tracking method for tracking a moving object by setting a tracking area corresponding to the moving object appearing in an image, setting a plurality of feature points in the tracking area, and tracking the plurality of feature points, comprising steps of:
 tracking each of the plurality of feature points from the preceding frame to the present frame;
 specifying the position of the tracking area in the present frame by estimating the motion of the tracking area on the basis of the tracking result of each of the feature points,
 detecting the occurrence of an occlusion of the moving object overlapping with an other object, and
 calculating an occlusion value indicating the possibility of the occurrence of the occlusion of the moving object by utilizing a change of a number of feature points being successfully tracked, wherein
 said moving object tracking method calculates a reliability indicator indicating a probability that a feature point has been tracked in the moving object for each of the feature points;
 calculates the motion of the tracking area using the reliability indicator of each feature point and the occlusion value;
 setting a plurality of groups of feature points among the feature points based on the respective reliability indicators; and
 calculating the occlusion value based on a change of the number of the feature points being successfully tracked among different groups of the plurality of groups of feature points.

10. A computer readable medium encoded with a program for making a computer execute a moving object tracking method for tracking a moving object by setting a tracking area corresponding to the moving object appearing in an image, by setting a plurality of feature points in the tracking area, and by tracking the plurality of feature points, said moving object tracking method comprising the steps of:
 tracking each of the plurality of feature points from the preceding frame to the present frame;
 specifying the position of the tracking area in the present frame by estimating the motion of the tracking area based the tracking result of each of the feature points;
 detecting the occurrence of an occlusion of the moving object overlapping with an other object; and
 calculating an occlusion value indicating the possibility of the occurrence of the occlusion of the moving object by utilizing a change of a number of feature points being successfully tracked, wherein
 said moving object tracking method calculates a reliability indicator indicating a probability that a feature point has been tracked in the moving object for each of the feature points,
 calculates the motion of the tracking area using the reliability indicator for each feature point and the occlusion value;
 setting a plurality of groups of feature points among the feature points based on the respective reliability indicators; and
 calculating the occlusion value based on a change of the number of the feature points being successfully tracked among different groups of the plurality of groups of feature points.

11. A monitoring apparatus comprising:
 an image processing unit configure to receive a picture signal output from imaging means to track a moving object appearing in an image indicated by the picture signal; and
 a security processing unit configured to monitor the moving object utilizing a tracking result output by the image processing unit, wherein
 said image processing unit sets a tracking area in an image corresponding to the moving object, and sets a plurality of feature points in the tracking area, and further tracks the plurality of feature points, and
 said image processing unit includes a tracking processing unit configured to track each of the plurality of feature points from the preceding frame to the present frame, a motion calculation processing unit configured to estimate the motion of the tracking area on the basis of a tracking result of each of the feature points to specify the position of the tracking area in the present frame, and
 an occlusion detecting unit configured to detect the occurrence of an occlusion of the moving object overlapping with an other object, said occlusion detecting unit calculates an occlusion value indicating the possibility of the occurrence of the occlusion of the moving object by utilizing a change of a number of feature points being successfully tracked, wherein
 said tracking processing unit calculates a reliability indicator indicating a probability that a feature point has been tracked in the moving object for each of the feature points, and said motion calculation processing unit calculates the motion of the tracking area using the reliability indicator for each of the feature points and the occlusion value; wherein said occlusion detecting unit sets a plurality of groups of feature points among the feature points based on the respective reliability indicators; and said occlusion detecting unit calculates the occlusion value based on a change of the number of the feature points being successfully tracked among different groups of the plurality of groups of feature points.

12. A game apparatus comprising:

an image processing unit configured to track a moving object appearing in an image encoded in an input picture signal;

a user's operation unit configured to accept an operation of a user; and a game processing unit configured to execute a game program on the basis of a tracking result output by the image processing unit and an operation signal from the user's operation unit, wherein said image processing unit sets a tracking area in an image corresponding to the moving object, and sets a plurality of feature points in the tracking area to track the plurality of feature points, and said image processing unit includes a tracking processing unit configured to track each of the plurality of feature points from the preceding frame to the present frame, a motion calculation processing unit configured to estimate the motion of the tracking area based on the tracking result of each of the feature points to specify the position of the tracking area in the present frame, and an occlusion detecting unit configured to detect the occurrence of an occlusion of the moving object overlapping with an other object, said occlusion detecting unit calculates an occlusion value indicating the possibility of the occurrence of the occlusion of the moving object by utilizing a change of a number of feature points being successfully tracked, wherein said tracking processing unit calculates a reliability indicator indicating a probability that a feature point has been tracked in the moving object for each of the feature points, and said motion calculation processing unit calculates the motion of the tracking area using the reliability indicator for each of the feature points and the occlusion value; wherein said occlusion detecting unit sets a plurality of groups of feature points among the feature points based on the respective reliability indicators; and said occlusion detecting unit calculates the occlusion value based on a change of the number of the feature points being successfully tracked among different groups of the plurality of groups of feature points.

13. The image processing apparatus of claim 1, wherein said occlusion detecting unit detects the occurrence of the occlusion based on the simultaneity of changes of the number of feature points among the plurality of groups.

14. The moving object tracking method of claim 9, wherein said detecting includes detecting the occurrence of the occlusion based on the simultaneity of changes of the number of feature points among the plurality of groups.

15. The computer readable medium of claim 10, wherein said detecting includes detecting the occurrence of the occlusion based on the simultaneity of changes of the number of feature points among the plurality of groups.

16. The monitoring apparatus of claim 11, wherein said occlusion detecting unit detects the occurrence of the occlusion based on the simultaneity of changes of the number of feature points among the plurality of groups.

17. The game apparatus of claim 12, wherein said occlusion detecting unit detects the occurrence of the occlusion based on the simultaneity of changes of the number of feature points among the plurality of groups.

* * * * *